United States Patent
Menachem et al.

(10) Patent No.: US 10,303,647 B2
(45) Date of Patent: May 28, 2019

(54) ACCESS CONTROL IN PEER-TO-PEER TRANSACTIONS OVER A PERIPHERAL COMPONENT BUS

(71) Applicant: Mellanox Technologies Ltd., Yokneam (IL)

(72) Inventors: Adi Menachem, Hod Hasharon (IL); Shachar Raindel, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 377 days.

(21) Appl. No.: 15/202,590

(22) Filed: Jul. 6, 2016

(65) Prior Publication Data

US 2017/0017609 A1    Jan. 19, 2017

Related U.S. Application Data

(60) Provisional application No. 62/192,582, filed on Jul. 15, 2015.

(51) Int. Cl.
| | | |
|---|---|---|
| *G06F 15/173* | (2006.01) | |
| *G06F 13/40* | (2006.01) | |
| *G06F 9/455* | (2018.01) | |
| *G06F 13/42* | (2006.01) | |

(52) U.S. Cl.
CPC .... *G06F 15/17331* (2013.01); *G06F 9/45558* (2013.01); *G06F 13/4022* (2013.01); *G06F 13/4282* (2013.01); *G06F 2009/45579* (2013.01)

(58) Field of Classification Search
CPC .................. G06F 13/4022; G06F 15/17331
See application file for complete search history.

(56) References Cited

U.S. PATENT DOCUMENTS

| | | | |
|---|---|---|---|
| 4,680,703 | A | 7/1987 | Kriz |
| 5,913,226 | A | 6/1999 | Sato |
| 6,490,647 | B1 | 12/2002 | Batchelor et al. |
| 7,721,049 | B2 | 5/2010 | Ehrlich et al. |
| 7,886,182 | B1 | 2/2011 | Coatney et al. |
| 9,104,582 | B1 | 8/2015 | Mukundan |
| 9,525,734 | B2 | 12/2016 | Izenberg et al. |

(Continued)

OTHER PUBLICATIONS

U.S. Appl. No. 15/058,262 office action dated Sep. 29, 2017.

(Continued)

*Primary Examiner* — Farley Abad
(74) *Attorney, Agent, or Firm* — Kligler & Associates

(57) ABSTRACT

Computing apparatus includes a central processing unit (CPU), which is configured to run concurrently multiple virtual machines, including at least first and second virtual machines. A peripheral component bus is connected to communicate with the CPU. Multiple peripheral devices are connected to communicate via the bus with the CPU and with others of the peripheral devices, including at least first and second peripheral devices that are each respectively partitioned into at least first and second functional entities, which are respectively assigned to serve the at least first and second virtual machines. Access control logic is configured to forward peer-to-peer communications initiated by the functional entities between the peripheral devices over the bus while inhibiting access in the peer-to-peer communications between the functional entities that are assigned to different ones of the virtual machines.

14 Claims, 3 Drawing Sheets

(56) References Cited

U.S. PATENT DOCUMENTS

| | | | |
|---|---|---|---|
| 9,645,931 B2 | 5/2017 | Cox et al. | |
| 9,645,932 B1 | 5/2017 | Bono et al. | |
| 9,678,871 B2 | 6/2017 | Voigt | |
| 2006/0179195 A1* | 8/2006 | Sharma | G06F 9/5077 710/123 |
| 2006/0256784 A1 | 11/2006 | Feng et al. | |
| 2006/0259661 A1 | 11/2006 | Feng et al. | |
| 2008/0256183 A1 | 10/2008 | Flynn et al. | |
| 2009/0300660 A1* | 12/2009 | Solomon | G06F 9/5061 719/321 |
| 2010/0205367 A1 | 8/2010 | Ehrlich et al. | |
| 2011/0153952 A1 | 6/2011 | Dixon et al. | |
| 2013/0198311 A1 | 8/2013 | Tamir et al. | |
| 2014/0195480 A1 | 7/2014 | Talagala et al. | |
| 2014/0258637 A1 | 9/2014 | Hong et al. | |
| 2015/0019903 A1* | 1/2015 | Arroyo | G06F 11/2002 714/5.1 |
| 2015/0067091 A1 | 3/2015 | Das | |
| 2015/0347349 A1 | 3/2015 | Raindel et al. | |
| 2016/0124877 A1 | 5/2016 | Hefty et al. | |
| 2017/0034268 A1 | 2/2017 | Govind | |

OTHER PUBLICATIONS

U.S. Appl. No. 15/177,348 office action dated May 17, 2018.
European Application # 17156357.0 Search Report dated Jul. 6, 2017.
PCI Express® Base Specification,Revision 3.0, 860pages, Nov. 10, 2010.
Menachem et al., U.S. Appl. No. 15/177,348, filed Jun. 9, 2016.
Nvidia Corporation, "Nvidia GPUDirect", 4 pages, year 2015.
U.S. Appl. No. 15/058,262 Office Action dated Jun. 2, 2017.

* cited by examiner

ACCESS CONTROL IN PEER-TO-PEER TRANSACTIONS OVER A PERIPHERAL COMPONENT BUS

CROSS-REFERENCE TO RELATED APPLICATION

This application claims the benefit of U.S. Provisional Patent Application 62/192,582, filed Jul. 15, 2015, which is incorporated herein by reference.

FIELD OF THE INVENTION

The present invention relates generally to computer systems, and particularly to peer-to-peer interactions over a peripheral component bus in a computer.

BACKGROUND

In many computer systems, peripheral devices communicate with the central processing unit (CPU) and with one another over a peripheral component bus, such as the PCI-Express® (PCIe®) bus. Such peripheral devices may include, for example, a solid state drive (SSD), a network interface controller (NIC), and various accelerator modules, such as a graphics processing unit (GPU).

Methods for directly accessing the local memory of a peripheral device via PCIe and other peripheral component buses are known in the art. For example, U.S. Patent Application Publication 2015/0347349, which is assigned to the assignee of the present patent application and whose disclosure is incorporated herein by reference, describes a method for communicating between at least first and second devices over a bus in accordance with a bus address space, including providing direct access over the bus to a local address space of the first device by mapping at least some of the addresses of the local address space to the bus address space. The term "direct access" means that data can be transferred between devices, over the bus, with no involvement of the software running on the CPU in the data plane.

As another example, GPUDirect RDMA is an application program interface (API) that supports interaction between an InfiniBand™ NIC (referred to as a host channel adapter, or HCA) and peer memory clients, such as GPUs. It is distributed by Mellanox Technologies Ltd. (Yokneam, Israel). This API provides a direct P2P (peer-to-peer) data path between the GPU memory and Mellanox HCA devices. It enables the HCA to read and write peer memory data buffers, and thus allows RDMA-based applications to use the computing power of the peer device without the need to copy data to host memory.

Some PCIe bus components support Access Control Services (ACS), as defined in section 6.12 (pages 533-542) of the *PCI Express Base Specification* (Rev. 3.0, referred to hereinbelow simply as the "PCIe specification"). ACS provides a number of facilities, including "ACS Source Validation" based on a "Bus Number" field in the Requester ID of transactions transmitted over the bus. When ACS Source Validation is enabled, the downstream ports of PCIe switches test the bus number of each upstream request received by the port to determine whether it is within a certain specified bus number "aperture" of the port. If this bus number is not within the prescribed aperture, an ACS Violation error is reported.

As another alternative, "ACS P2P Request Redirect" can be used to cause PCIe switches to redirect peer-to-peer requests that they receive to the root complex for request validation. The root complex then determines whether the request should be "reflected" back downstream toward its original target, or blocked as an ACS Violation error.

In a similar vein, U.S. Patent Application Publication 2006/0179195 describes a method and an apparatus for restricting input/output (I/O) device peer-to-peer (P2P) operations in a data processing system, in a manner that is said to improve reliability, availability, and serviceability. P2P control logic performs a lookup of P2P lookup table entries. Each P2P lookup table entry comprises bus, device and function number fields, optional control fields, and an accept/reject bit. Upon receiving a communication request from a requesting I/O device, the P2P control logic implemented in either a logical bridge or an I/O device identifies the requester ID of the request and determines whether a match exists in the P2P lookup table entries. If a match is found and the accept/reject bit is enabled, I/O operations can be received from the requester.

SUMMARY

Embodiments of the present invention that are described hereinbelow provide improved methods for controlling peer-to-peer transactions between peripheral devices in a computer, as well as devices and systems that implement such methods.

There is therefore provided, in accordance with an embodiment of the invention, computing apparatus, which includes a central processing unit (CPU), which is configured to run concurrently multiple virtual machines, including at least first and second virtual machines. A peripheral component bus is connected to communicate with the CPU. Multiple peripheral devices are connected to communicate via the bus with the CPU and with others of the peripheral devices, including at least first and second peripheral devices that are each respectively partitioned into at least first and second functional entities, which are respectively assigned to serve the at least first and second virtual machines. Access control logic is configured to forward peer-to-peer communications initiated by the functional entities between the peripheral devices over the bus while inhibiting access in the peer-to-peer communications between the functional entities that are assigned to different ones of the virtual machines.

In one embodiment, the access control logic is embedded in at least the first peripheral device and is configured to screen the communications initiated by the functional entities in the first peripheral device before transmitting the communications to the bus. Alternatively or additionally, the access control logic is embedded in the second peripheral device and is configured to screen the communications received from the bus before delivering the communications to the functional entities in the second peripheral device.

Further alternatively or additionally, the peripheral component bus includes a switch, which is configured to transfer the communications between the peripheral devices, and the access control logic is embedded in the switch. Typically, the access control logic in the switch is configured to filter the communications between the functional entities without forwarding the communications to a root complex of the bus. In a disclosed embodiment, at least the first peripheral device is configured to assign different, respective requester identifiers to at least the first and second functional entities of the first peripheral device, and to incorporate the respective requester identifiers in headers of packets transmitted over the peripheral component bus to carry the peer-to-peer communications initiated by the functional entities, and the access control logic is configured to decide whether to forward or inhibit the peer-to-peer communications based on the requester identifiers in the headers.

In some embodiments, the peripheral devices are configured to associate respective entity identifiers with the functional entities, and the access control logic is configured to maintain a table indicating a respective access permission level for each pair of a source entity identifier in a source peripheral device and a destination entity identifier in a destination peripheral device. In a disclosed embodiment, each entry indicates, for a corresponding pair of source and destination entity identifiers, whether access is fully permitted, access is limited, or access is denied, and the access control logic is configured to inhibit the peer-to-peer communications when the access is limited or denied.

There is also provided, in accordance with an embodiment of the invention, a method for operating a computer, which includes a central processing unit (CPU) and multiple peripheral devices, which are connected to communicate via a peripheral component bus with the CPU and with others of the peripheral devices. The method includes concurrently running multiple virtual machines, including at least first and second virtual machines, on the CPU. At least some of the peripheral devices are partitioned into multiple functional entities, including at least first and second peripheral devices that are each respectively partitioned into at least first and second functional entities, which are respectively assigned to serve the at least first and second virtual machines. Peer-to-peer communications initiated by the functional entities are forward between the peripheral devices over the bus while inhibiting access in the peer-to-peer communications between the functional entities that are assigned to different ones of the virtual machines.

The present invention will be more fully understood from the following detailed description of the embodiments thereof, taken together with the drawings in which:

DETAILED DESCRIPTION OF EMBODIMENTS

Figure 1:
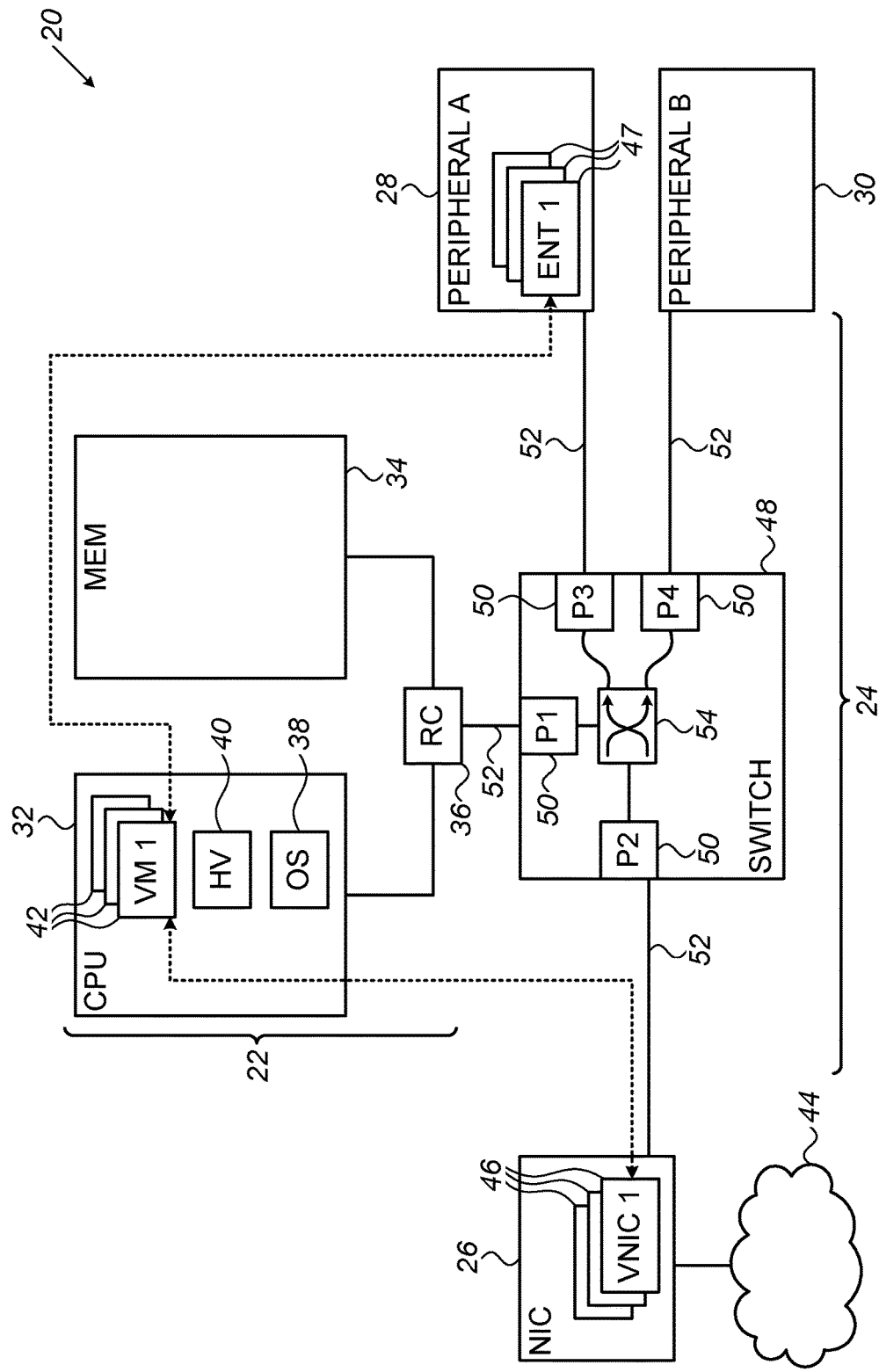
FIG. 1 is block diagram that schematically illustrates a computer that implements entity-based access control among peripheral devices in the computer, in accordance with an embodiment of the invention.

In many computers, the central processing unit (CPU), is able to run multiple virtual machines concurrently, whereby the computer is logically partitioned into two or more distinct computing entities. Virtualization software that is known in the art maintains strict separation between the virtual machines, each of which has its own memory space and files, for example, and is unable to access the resources that are assigned to other virtual machines.

Some peripheral devices, such as NICs and SSDs, also support virtualization and thus can be partitioned (physically and/or logically) into multiple, separate functional entities, which are respectively assigned to serve different virtual machines. For example, a NIC (as well as other devices) on a PCIe bus can be configured to support single-root input/output virtualization (SR-IOV), and thus expose multiple, logically distinct virtual NICs (VNICs). Typically, each virtual machine is restricted in software to accessing only its own assigned VNIC. Virtual machines may similarly be constrained to access only their own assigned functional entities in other sorts of peripheral devices.

Peer-to-peer communications between peripheral devices over the bus, however, are not generally subject to such restrictions. Thus, for example, a VNIC that is assigned to a given virtual machine could initiate a bus transaction with a functional entity within an SSD or GPU that is assigned to a different virtual machine. This sort of transaction, whether intentional or accidental, would break the desired partitioning between virtual machines, leading to unforeseen and undesirable consequences. In computers that are known in the art, it is possible to avoid such situations by forcing peer-to-peer transactions to go through the main memory of the corresponding virtual machine or through the root complex of the bus (using ACS P2P Request Redirect, as described in the Background section), but these mechanisms are cumbersome and substantially increase the transaction latency.

Embodiments of the present invention that are described herein address these problems by adding novel access control logic in either the peripheral devices themselves or in a switch on the bus that connects the peripheral devices. The access control logic forwards peer-to-peer communications initiated by the functional entities between the peripheral devices over the bus, while inhibiting access between the functional entities that are assigned to different virtual machines. This approach thus ensures that the desired separation is maintained between the operations of different virtual machines, with little or no effect on the latency of bus transactions.

In the disclosed embodiments, the peripheral devices associate respective entity identifiers (entity IDs) with the functional entities into which they are partitioned. The access control logic maintains a table indicating the respective access permission level for each pair of a source entity ID on a source peripheral device and a destination entity ID on a destination peripheral device. For each pair of source and destination entity IDs, the corresponding table entry indicates whether access is fully permitted, access is limited (for example, to read data only but not write), or access is denied. For each peer-to-peer communication, the access control logic looks up the source and destination entity IDs in the table and thus inhibits the communications appropriately when the access is limited or denied.

FIG. 1 is a block diagram that schematically illustrates a computer 20, in accordance with an embodiment of the invention. Computer 20 comprises computing apparatus in the form of a host complex 22, comprising a CPU 32 and a system memory 34, which are connected by a root complex (RC) 36 to a peripheral component bus 24, such as a PCIe bus. Bus 24 connects host complex 22 to peripheral devices 26, 28, 30, including a NIC 26 and other devices (such as a GPU or SSD), labeled "peripheral A" and "peripheral B." NIC 26, which connects computer 20 to a network 44, is shown only as an example of a peripheral device that can take part in the methods described herein, and in alternative embodiments (not shown in the figures), computer 20 may comprise peripheral devices of other types that interact with host complex 22 and one another in this manner.

Bus 24 comprises several links 52 connected to respective ports 50 (labeled P1, P2, etc.) of at least one switch 48. Forwarding logic 54 in switch 48 transfers communications on bus 24 between ports 50 in accordance with the destination addresses of the bus communications. In the present example, switch 48 and links 52 are assumed to carry and forward bus packets in accordance with the above-mentioned PCIe specification, with the possible addition of entity-based access control functions in switch as described hereinbelow with reference to FIG. 4. Alternatively, however, the techniques of entity-based access control that are described herein may be applied, mutatis mutandis, over peripheral component buses of other types.

CPU 32 runs a native operating system (OS) 38 and a hypervisor 40 (HV), also referred to as a virtual machine monitor. Hypervisor 40 supports multiple virtual machines (VMs) 42, each of which runs a guest operating system and applications, as is known in the art. Typically, each VM runs in isolation from the other VMs, with its own partition in memory 34, and different VMs may be assigned to different users.

In addition, in the pictured embodiment, NIC 26 is partitioned into multiple functional entities referred to as VNICs 46, which are respectively assigned to serve different VMs 42. Similarly, peripheral device 28 (peripheral A) is partitioned into multiple functional entities 47 (labeled ENT1, etc.), which are similarly assigned to serve different VMs 42. These functional entities 46, 47 may comprise actual physical entities within peripheral devices 26, 28. Additionally or alternatively, entities 46, 47 may comprise logical entities that share physical resources. Each functional entity is assigned a respective entity ID, which is incorporated in an appropriate source or destination field of bus communications sent from or to the entity. (For example, the source entity ID may be incorporated in the Requester ID field of packets transmitted over a PCIe bus.) On the other hand, other peripheral devices, such as device (peripheral B), may not be partitioned in this manner, and may instead be shared among multiple VMs 42 or dedicated to a certain VM or subset of the VMs.

As explained earlier, computer 20 comprises access control logic, which is configured to forward peer-to-peer communications initiated by functional entities 46, 47 between peripheral devices 26, 28, . . . , over bus 24, while inhibiting access in the peer-to-peer communications between functional entities that are assigned to different VMs 42. This access control logic ensures, for example, that VNIC1 in NIC 26 has full privileges to send peer-to-peer communications over bus 24 to ENT1 in device 28, while inhibiting communications by VNIC 1 with entities 47 that are assigned to other VMs 42. This access control logic may be embedded in one or more of peripheral devices 26, 28, . . . , or in switch 48, or both. A number of different possible implementations are shown in the figures that follow. Other implementations will be apparent to those skilled in the art after reading the present description and are considered to be within the scope of the present invention.

Figure 2:
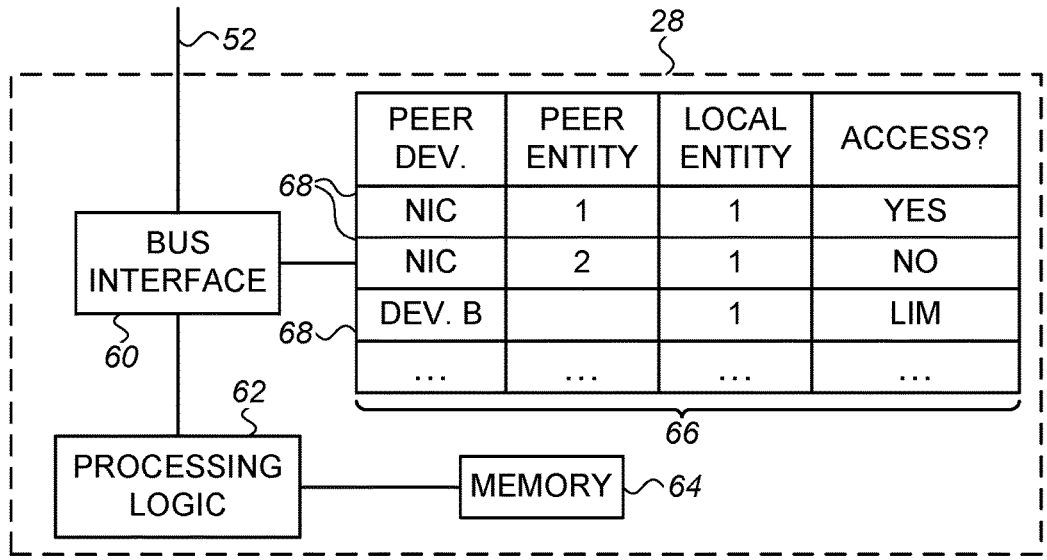
FIG. 2 is a block diagram that schematically shows details of a peripheral device supporting multiple logical entities, in accordance with an embodiment of the invention.

FIG. 2 is a block diagram that schematically shows details of peripheral device 28, illustrating implementation of entity-based access control logic for incoming bus communications directed to multiple logical entities within device 28, in accordance with an embodiment of the invention. Device 28 comprises a bus interface 60, which connects device 28 to link 52 of bus 24. Bus interface 60 applies access control logic, in the form of an embedded table 66, in screening the communications received from bus 24 before delivering the communications to the functional entities in device 28. Bus interface 60 passes the communications that are accepted to processing logic 62 and/or allows peer-to-peer direct memory access (DMA) requests to read from and write to a memory 64 in device 28. Alternatively, the access control logic may be implemented by processing logic 62, rather than bus interface 60.

In the present embodiment, bus interface 60 checks the source and destination entity IDs that are included in communications received from link 52 against corresponding entries 68 in table 66. Each entry 68 is indexed by the peer device (for example, NIC 26) that sent the communication, along with the source entity ID in the peer device and the destination (local) entity ID in device 28. Each entry 68 indicates the access permission level for this pair of entities, stating whether access is fully permitted, access is limited, or access is denied. Bus interface 60 handles the incoming communications accordingly. Access may be limited, for example, to read-only, or to posted or non-posted access requests, or to translated or non-translated access (as defined by the PCIe specification). Typically, when access is denied, bus interface 60 will ignore the communication or return an error message, for example to hypervisor 40.

In the pictured example, communications from entity 1 in NIC 26 to entity 1 in device 28 are permitted, while those from entity 2 to entity 1 are denied. Peripheral device B, which is not partitioned into entities, is allowed limited access to entity 1 in device 28. Other entries (not shown in the figure) cover other possible source/destination pairs. Typically, entries 68 are written by software running on CPU 32, for example as a function of the basic input/output system (BIOS) or of hypervisor 40, which assigns entity IDs and configures corresponding entries 68 as part of the process of provisioning virtual machines 42.

Table 66 can be implemented in random access memory (RAM) or content-addressable memory (CAM), including ternary CAM (TCAM), as is known in the art, in order to support efficient matching. The use of TCAM is particularly effective in supporting "wild cards," to allow matching of partial sets of the relevant properties, and selection of the most suitable entry when there are multiple matches. Similar implementation considerations apply to the tables used in the embodiments that follows.

Figure 3:
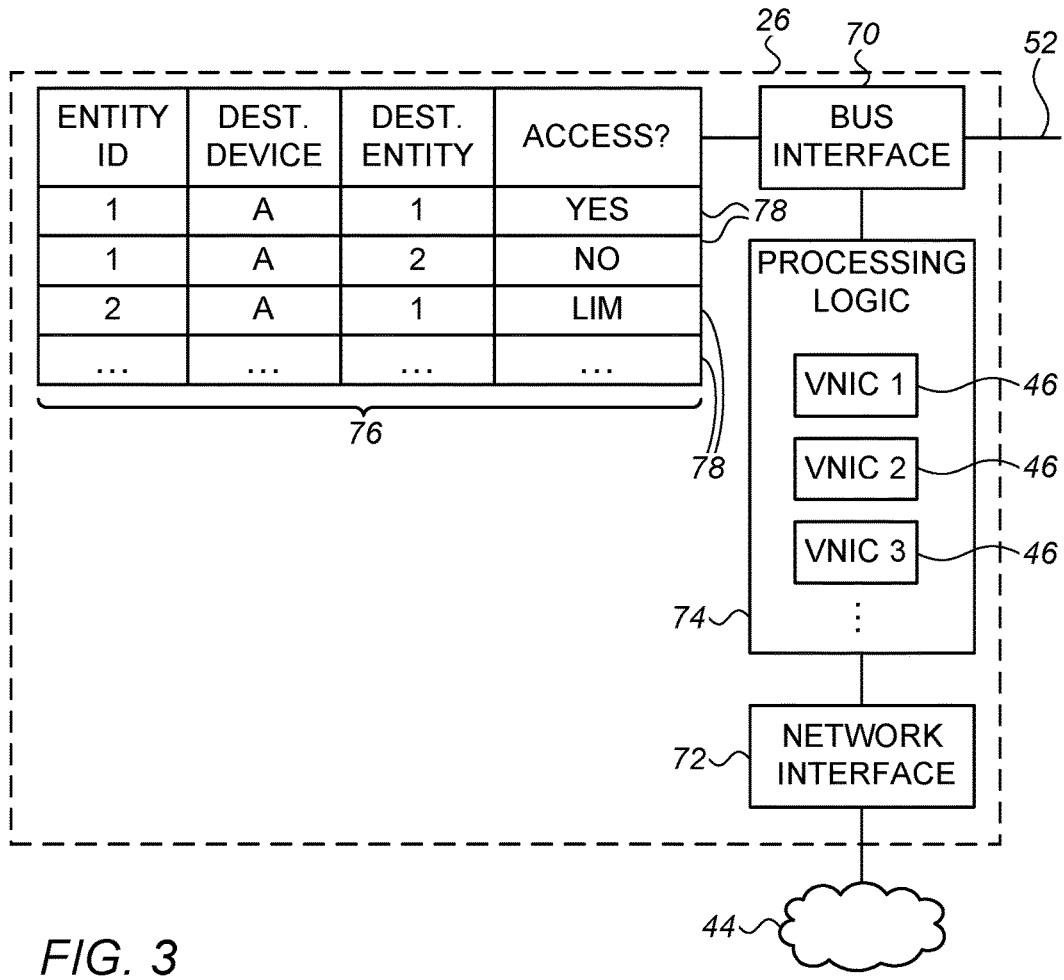
FIG. 3 is a block diagram that schematically shows details of a network interface controller (NIC) supporting multiple virtual NICs, in accordance with an embodiment of the invention.

FIG. 3 is a block diagram that schematically shows details of NIC 26 illustrating implementation of entity-based access control logic for outgoing bus communications initiated by multiple VNICs 46, in accordance with another embodiment of the invention. NIC 26 comprises a bus interface 70, which connects to link 52 of bus 24, and a network interface 72, which connects to network 44. Packet processing logic 74 in NIC 26 receives packets from network via network interface 72 and accordingly initiates transactions on bus 24 via bus interface 70. Logic 74 likewise generates packets for transmission to network 44 in response to commands and other transactions directed to bus interface 70 over bus 24. In this capacity, logic 74 supports multiple VNICs 46, which transmit and receive packets on behalf of multiple VMs 42, with each VNIC assigned to serve a different, respective VM.

In response to commands from the corresponding VM 42 or request messages from network 44, VNICs 46 may initiate peer-to-peer communications to functional entities on other peripheral devices on bus 24, such as entities 47 on device 28. Bus interface 70 applies access control logic, in the form of an embedded table 76, in order to screen these outgoing bus communications. (Alternatively, the access control logic may be applied by packet processing logic 74.) Each entry 78 in table 76 is indexed by the entity ID of the source entity (i.e., the source VNIC 46), as well as by the destination device and destination entity ID. As in the preceding embodiment, each entry 78 indicates whether access to the destination entity in question is allowed, denied or limited. Bus interface 70 transmits only allowed communications to link 52 (or when access is limited, only communications of the allowed types), while blocking other communication attempts.

Figure 4:
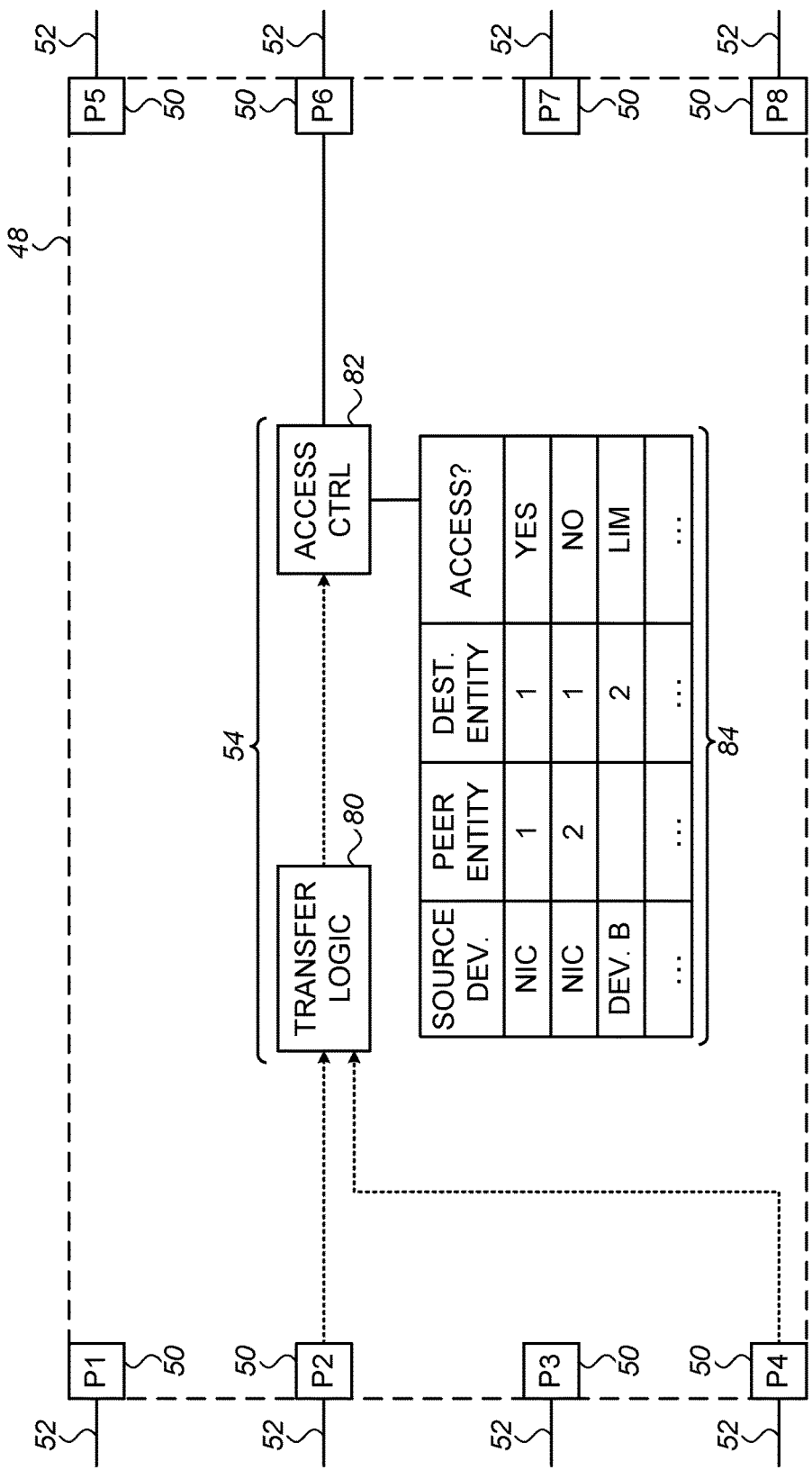
FIG. 4 is a block diagram that schematically shows details of a switch on a peripheral component bus that enforces entity-based access control, in accordance with an embodiment of the invention.

FIG. 4 is a block diagram that schematically shows details of switch 48 on peripheral component bus 24, illustrating the implementation of entity-based access control logic in the switch in accordance with a further embodiment of the invention. In this example, bus 24 is assumed to operate in accordance with the PCIe specification, so that forwarding logic 54, embedded in switch 48, transfers bus packets between ingress and egress ports 50 according to the addresses in the packet headers. These packet headers are also assumed to contain the source and destination entity IDs, for example in the PCIe Requester ID field.

Forwarding logic 54 comprises transfer logic 80, which identifies the egress port through which each incoming packet is to be forwarded, and access control logic 82, which decides whether to forward or inhibit peer-to-peer communications based on the entity IDs, using an access table 84. Access control logic 82 filters the communications between the functional entities in peripheral devices 26, 28, . . . , using the information in table 84, without having to forward the communications to root complex 36. Table 84 may be associated with a particular egress port (P6 in the present example), in which case switch 48 may comprise multiple instances of the access control logic and table, or it may be centralized and process communications directed to all egress ports. In either case, as in the preceding examples, access control logic 82 uses the entries in table 84 in deciding whether to forward or inhibit transmission of the bus communications to their respective destination entities.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
   a central processing unit (CPU), which is configured to run concurrently multiple virtual machines, including at least first and second virtual machines;
   a peripheral component bus, connected to communicate with the CPU;
   multiple peripheral devices, connected to communicate via the bus with the CPU and with others of the peripheral devices, including at least first and second peripheral devices that are each respectively partitioned into at least first and second functional entities, which are respectively assigned to serve the at least first and second virtual machines; and
   access control logic, which is configured to forward peer-to-peer communications initiated by the functional entities between the peripheral devices over the bus while inhibiting access in the peer-to-peer communications between the functional entities that are assigned to different ones of the virtual machines,
   wherein the peripheral devices are configured to associate respective entity identifiers with the functional entities, and wherein the access control logic is configured to maintain a table indicating a respective access permission level for each pair of a source entity identifier in a source peripheral device and a destination entity identifier in a destination peripheral device.

2. The apparatus according to claim 1, wherein the access control logic is embedded in at least the first peripheral device and is configured to screen the communications initiated by the functional entities in the first peripheral device before transmitting the communications to the bus.

3. The apparatus according to claim 1, wherein the access control logic is embedded in the second peripheral device and is configured to screen the communications received from the bus before delivering the communications to the functional entities in the second peripheral device.

4. The apparatus according to claim 1, wherein the peripheral component bus comprises a switch, which is configured to transfer the communications between the peripheral devices, and wherein the access control logic is embedded in the switch.

5. The apparatus according to claim 4, wherein the access control logic in the switch is configured to filter the communications between the functional entities without forwarding the communications to a root complex of the bus.

6. The apparatus according to claim 1, wherein each entry indicates, for a corresponding pair of source and destination entity identifiers, whether access is fully permitted, access is limited, or access is denied, and wherein the access control logic is configured to inhibit the peer-to-peer communications when the access is limited or denied.

7. Computing apparatus, comprising:
   a central processing unit (CPU), which is configured to run concurrently multiple virtual machines, including at least first and second virtual machines;
   a peripheral component bus, connected to communicate with the CPU;
   multiple peripheral devices, connected to communicate via the bus with the CPU and with others of the peripheral devices, including at least first and second peripheral devices that are each respectively partitioned into at least first and second functional entities, which are respectively assigned to serve the at least first and second virtual machines; and
   access control logic, which is configured to forward peer-to-peer communications initiated by the functional entities between the peripheral devices over the bus while inhibiting access in the peer-to-peer communications between the functional entities that are assigned to different ones of the virtual machines,
   wherein the peripheral component bus comprises a switch, which is configured to transfer the communications between the peripheral devices, and wherein the access control logic is embedded in the switch, and
   wherein at least the first peripheral device is configured to assign different, respective requester identifiers to at least the first and second functional entities of the first peripheral device, and to incorporate the respective requester identifiers in headers of packets transmitted over the peripheral component bus to carry the peer-to-peer communications initiated by the functional entities, and
   wherein the access control logic is configured to decide whether to forward or inhibit the peer-to-peer communications based on the requester identifiers in the headers.

8. A method for operating a computer, which includes a central processing unit (CPU) and multiple peripheral devices, which are connected to communicate via a peripheral component bus with the CPU and with others of the peripheral devices, the method comprising:

concurrently running multiple virtual machines, including at least first and second virtual machines, on the CPU;

partitioning at least some of the peripheral devices into multiple functional entities, including at least first and second peripheral devices that are each respectively partitioned into at least first and second functional entities, which are respectively assigned to serve the at least first and second virtual machines;

associating respective entity identifiers with the functional entities; and forwarding peer-to-peer communications initiated by the functional entities between the peripheral devices over the bus while inhibiting access in the peer-to-peer communications between the functional entities that are assigned to different ones of the virtual machines, wherein forwarding the peer-to-peer communications comprises maintaining a table indicating a respective access permission level for each pair of a source entity identifier in a source peripheral device and a destination entity identifier in a destination peripheral device.

9. The method according to claim 8, wherein forwarding the peer-to-peer communications comprises screening the communications initiated by the functional entities in the first peripheral device using access control logic embedded in at least the first peripheral device before transmitting the communications to the bus.

10. The method according to claim 8, wherein forwarding the peer-to-peer communications comprises screening the communications received from the bus by the second peripheral device using access control logic embedded in the second peripheral device before delivering the communications to the functional entities in the second peripheral device.

11. The method according to claim 8, wherein forwarding the peer-to-peer communications comprises transferring the communications through a switch on the peripheral component bus, and wherein inhibiting the access comprises screening the communications using access control logic embedded in the switch.

12. The method according to claim 11, wherein screening the communications comprises filtering the communications between the functional entities in the switch without forwarding the communications to a root complex of the bus.

13. The method according to claim 11, and comprising:

assigning different, respective requester identifiers to at least the first and second functional entities of the first peripheral device; and incorporating the respective requester identifiers in headers of packets transmitted over the peripheral component bus to carry the peer-to-peer communications initiated by the functional entities, wherein screening the communications comprises deciding whether to forward or inhibit the peer-to-peer communications based on the requester identifiers in the headers.

14. The method according to claim 8, wherein each entry indicates, for a corresponding pair of source and destination entity identifiers, whether access is fully permitted, access is limited, or access is denied, and wherein inhibiting the access comprises inhibiting the peer-to-peer communications when the access is limited or denied.

* * * * *